United States Patent [19]

Rion

[11] 4,110,487
[45] Aug. 29, 1978

[54] DUAL COAT CERAMIC LAYER PREPARED BY SINGLE FIRING

[75] Inventor: Richard G. Rion, Parma, Ohio

[73] Assignee: Ferro Corporation, Cleveland, Ohio

[21] Appl. No.: 736,569

[22] Filed: Oct. 28, 1976

[51] Int. Cl.² ............... B05D 1/04; B05D 3/02; B05D 1/36

[52] U.S. Cl. .................. 427/27; 427/193; 427/201; 427/203; 427/204; 427/205; 427/376 A; 427/376 C; 427/376 D; 427/419 C; 428/428; 428/538

[58] Field of Search ............. 427/27, 193, 201, 202, 427/203, 204, 205, 376 A, 376 C, 376 D, 402, 419 C; 106/73.1; 428/538, 411, 426, 428

[56] References Cited

U.S. PATENT DOCUMENTS

| | | | |
|---|---|---|---|
| 1,459,357 | 6/1923 | Booze | 428/539 X |
| 1,898,500 | 2/1933 | Schulz | 427/193 |
| 2,864,721 | 12/1958 | King et al. | 427/419 C X |
| 3,086,880 | 4/1963 | Compton | 427/376 A X |
| 3,216,847 | 11/1965 | Armant | 427/202 |
| 3,513,012 | 5/1970 | Point et al. | 427/27 |
| 3,647,509 | 3/1972 | Keiser et al. | 106/48 X |
| 3,671,278 | 6/1972 | Borowski | 106/48 X |
| 3,928,668 | 12/1975 | Snow | 427/27 X |
| 3,930,062 | 12/1975 | Nedeljkovic | 427/27 |

FOREIGN PATENT DOCUMENTS

| | | | |
|---|---|---|---|
| 1,582,316 | 9/1969 | France | 427/376 C |
| 1,236,614 | 6/1971 | United Kingdom | 427/202 |

*Primary Examiner*—Shrive P. Beck
*Attorney, Agent, or Firm*—Milton L. Simmons; Wesley B. Taylor

[57] ABSTRACT

A process and resulting product are disclosed characterized by superimposing two layers of essentially dry, differing frit compositions onto a substrate and then firing only once to form a dual coat coherent ceramic layer. The composition of the two frits is such that the first or base coat fuses and stabilizes during the firing operation at temperatures below that at which the second or cover coat fuses and stabilizes. Desirably, the first layer forms an amorphous glass adherent to the substrate that is predominantly an alkaline oxide borosilicate glass and preferably an alkaline borofluorosilicate glass.

16 Claims, 2 Drawing Figures

4,110,487

DUAL COAT CERAMIC LAYER PREPARED BY SINGLE FIRING

BACKGROUND OF THE INVENTION

The preparation of a surface of steel or other iron-containing workpiece to receive a coat of ceramic (often also called enamel-coat or porcelain enamel) has presented a number of problems to the industry if a tightly adherent, defect-free ceramic coating is to be obtained. Preparation of an iron-containing workpiece for enameling presently involves a long and fairly complex series of operations performed in both hot and cold solutions which require careful control of temperature, pH, and concentration.

In one practice, two ceramic coats are sequentially applied, the first being called a base or ground coat and the second, a cover coat. The cover coat is designed to have good chemical and exposure resistant properties, esthetic appeal, etc., but unfortunately normally has poor adherent properties to a substrate, especially a carbon-rich metallic substrate. The base coat is one which is adapted to adhere well to the substrate, so that the two coats together form a tightly adherent ceramic coating having in cooperation the desired adherent, chemical and exposure resistant properties and attractive appearance.

In order to carry out such a two coat operation, it is necessary to use a different frit composition for each coat. Each frit composition is milled, dried, and after application to the workpiece, each coat must in turn be fired. To eliminate the base coat application and all that it entails, a so-called direct-on or a single application of a ceramic coat has been proposed. In this case, the application normally is limited to special and expensive grades of steel, such as zero carbon steel which may contain up to about 0.003 percent carbon. Further, it is necessary to etch the surface of such a workpiece, as with sulfuric acid, as a preliminary step which ordinarily is more expensive than for base coat and cover coat applications. As an example, an acid etch may remove as much 3.5 grams per square foot of zero carbon steel which is relatively expensive.

Not only does a workpiece previously designed for direct-on enameling require a more severe etch, but it also generally requires a heavier deposit of nickel to obtain adherence in the absence of the use of highly colored adherent oxides, such as cobalt oxides, found in base coats. Since the higher carbon contents of steel like cold-rolled steel result in unacceptable enamel defects if base coats are omitted, these grades of steel have not been extensively used for direct-on ceramic or enamel coating.

Attempts have been made in the past to eliminate a double firing operation in applying two different frit compositions onto a substrate. The firing step intermediate the two applications of frit was eliminated, and a single firing step delayed until after both frit compositions were applied. Such applications of frit were made from wet systems, such as slips, and have been unsuccessful, resulting in poor ceramic coatings. The failure of this technique is believe to be due to salt migration. Wet milled frit compositions, even if milled in water with no mill addition, contain soluble salts leached from the frit. The degree of solubility depends on the particular frit, as well as the fineness of grind, temperature of milling, and aging time. Moreover, salts are normally added as mill additions to obtain proper rheological properties for the various methods of application, such as spraying, flow coating and the like. These additives include clays and water-soluble inorganic metal salts, such as water-soluble alkaline metal salts, and carbonates and nitrates formed from mixture of the wet system with atmospheric air. As a result, when it is attempted to apply two coats from wet systems such as slips, the soluble salts migrate from the base coat to the cover coat and from the cover coat to the base coat, upsetting the desired formulations of these frit compositions and resulting in a blistered, pitted, and frothy appearance of the surface after completion of the firing operation.

SUMMARY OF THE INVENTION

It has now been discovered that a two coat, one fire operation can be carried out to provide a dual coat ceramic coherent layer which is tightly adherent to a substrate, if the application of each of the two frit compositions is made from an essentially dry and preferably completely dry system; and if the first or base coat is prepared from a frit composition which preferably forms an amorphous glass adherent to the substrate and which has fusing and stabilizing temperatures below those of the frit composition which forms second or cover coat.

The substrate is preferably metallic and may be either a premium metal, such as decarborized steel, or a non-premium metal such as many of the cold-rolled steel alloys. The frit compositions are preferably used as completely dry powders and applied sequentially to the substrate, such as by dusting or electrostatic means.

While the frit composition of the cover coat may comprise many different compositions, the nature of the base coat is quite important. In accordance with the present invention, the base coat must fuse and stabilize (cease reaction) within a temperature range which is below the temperature range within which the cover coat fuses and stabilizes. Preferably also, the base coat completes its fusing and stabilizing within a relatively short time.

Frit compositions which serve well as the base coat are alkaline oxide borosilicate glasses and especially alkaline oxide fluoroborosilicate glasses. Preferably, the amount of alkaline oxides in such glasses ranges from about 15% to about 40% by weight of the glass.

In operation, each frit composition is applied, in turn, as a dry or essentially dry powder onto the substrate, followed by a single firing operation in which the fusing and stabilization of the two frit compositions take place sequentially as described. Upon cooling, a dual coat coherent ceramic layer forms on the substrate from the two frit compositions, which adheres well to the substrate and has good physical properties and appearance.

DESCRIPTION OF THE PREFERRED EMBODIMENTS

Figure 1:
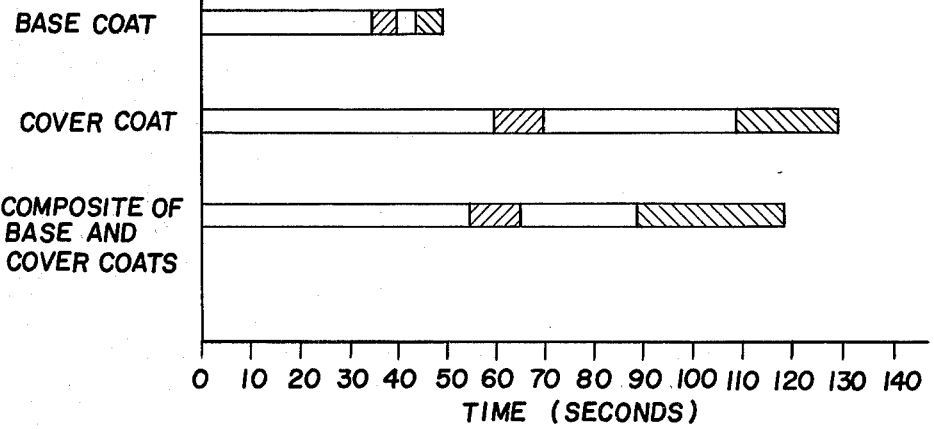
FIG. 1 is a bar graph illustrating the relative times required individually for a base coat and cover coat and for a composite base and cover coat to fuse and then to cease reaction.

The present once-fired ceramic product comprises a substrate and a dual coat, coherent ceramic layer overlying the substrate. The dual coat comprises a first coat of preferably amorphous glass adherent to the substrate and a second coat of a glass, amorphous or crystalline, coherent with the first coat. The glass of the first coat has fusing and stabilizing temperatures below the fusion and stabilizing temperatures of the second coat.

When particles of a frit composition begin to fuse, a considerable reaction can take place before the frit becomes a quiescent molten mass. Gases evolved which can arise from the frit itself or from reaction between the molten frit particles and a metal substrate, particularly if the latter is a non-premium alloy such as cold-rolled steel. When two superimposed coats are simultaneously heated, the cover or top coat also experiences a like gas evolution. Since in such a situation the base coat is trapped between the substrate and the cover coat, the role of the first or base coat is most important of all.

In accordance with the present invention, the frit composition forming the base coat fuses and completes its accompanying gasification and reaction, that is becomes stabilized, within a temperature range which is below the temperature range within which the cover coat fuses and becomes stabilized. In this manner, all gases evolve and reaction attending the fusing and stabilization of the base coat is completed before the cover coat becomes sufficiently widespread over the base coat and viscous to close off escaping gases. A dual coat coherent ceramic layer results which tightly adheres to the substrate.

Considering in greater detail the described components, the substrate may be any fairly rigid matter, usually metal, adapted to resist the temperatures of a firing operation. One advantage of the invention is that many different metals and alloys can be used, for example, both premium metals such as decarborized steel or non-premium metals such as many cold-rolled steel alloys.

In order to qualify as a frit composition for the base coat, the frit preferably forms an amorphous glass to aid in adherence to the substrate and must have fusing and stabilizing temperatures below that of the frit forming the cover coat. In this manner, reaction and gasification attending fusing of the base coat are completed before the cover coat is sufficiently formed to choke off gas evolution. Frit compositions well suited to form a base coat are predominantly alkaline oxide borosilicate glasses and preferably alkaline oxide borofluorosilicate glass. Preferably, the amount of alkaline oxides in such glasses range from about 15% to about 40% by weight. Alkaline oxides are taken to include those of sodium, potassium, lithium, calcium, barium strontium, and the like. Alkalikne oxides of sodium, potassium, barium, and calcium are preferred.

The alkaline oxide borosilicate glasses preferably have approximately the following composition in weight percent:

$B_2O_3$: 8% to 25%
$SiO_2$: 20% to 50%
Alkaline Oxides: 15% to 40%

When the glass of the base coat is an alkaline oxide borofluorosilicate glass, it has the following desired and preferred compositions in weight percent:

|  | Desired Range | Preferred Range |
|---|---|---|
| Alkaline Oxides | 12% to 30% | 15% to 26% |
| Boron Oxide | 10% to 30% | 12% to 20% |
| Fluorine | 0.1% to 10% | 0.5% to 5% |
| Silica | 20% to 50% | 25% to 50% |

The fluorine is present as a fluoride of a metal of the glass replacing an equivalent amount of oxygen. In addition to the indicated components, all of the disclosed glass compositions may contain various other components conventionally used in the art as formers, modifiers, and fluxes. These additives may be used to improve adhesion or acid resistance, modify physical properties, lower melting points, and the like, as is understood in the art. For example, any of the indicated glass compositions may contain in addition in weight percent the following:

Cobalt Oxide: 0 to 7%
Nickel Oxide: 0 to 7%
Manganese Oxide: 0 to 7%
Iron Oxide: 0 to 3%
Aluminum Oxide: 0 to 15%
Zirconium Oxide: 0 to 25%
Zinc Oxide: 0 to 10%
$P_2O_5$: 0 to 5%
Calcium Oxide: 0 to 15%
Cesium Oxide: 0 to 5%
Strontium Oxide: 0 to 3%

Where employed, the total amount of such additives is desirably in the range of about 5% to 45% by weight and preferably from about 20% to about 40% by weight of either the alkaline oxide borofluorosilicate glasses or the alkaline oxide borosilicate glasses.

The frit composition forming the cover coat may be any known composition commonly used for enameling. The glass formed from the cover coat composition need be only adherent to the base coat and otherwise may have any physical properties as may be desired for a particular application. Where the present dual coat ceramic layer is applied over kitchen or lavatory appliances, titania-base glasses are often used because of their white, esthetic appearance. However, many different frit compositions can be used for the cover coat, such as compositions corresponding to the following in weight percent:

$Al_2O_3$: 0 to 20%
BaO: 0 to 20%
$B_2O_3$: 0 to 30%
CaO: 0 to 30%
$K_2O$: 0 to 20%
$Li_2O$: 0 to 15%
$Na_2O$: 0 to 20%
$P_2O_5$: 0 to 20%
$Sb_2O_3$: 0 to 30%
$SiO_2$: 10 to 60%
$TiO_2$: 0 to 30%
ZnO: 0 to 20%
F: 0 to 10%
Metal Oxides: 10 to 70%

The fluorine, when used, is present as a fluoride of a metal of the glass replacing an equivalent amount of oxygen, and the metal of the metal oxides may include copper, cobalt, manganese, chromium, and like metals, and mixtures thereof.

The cover coat may be a porous ceramic coat containing an oxidation catalyst for use as a self-cleaning oven liner, such as is disclosed in U.S. Pat. No. 3,547,098 to Lee and U.S. Pat. No. 3,671,278 to Borowski. The cover coat may be transparent or opaque or semi-opaque as from the presence of a pigment.

In operation, each frit composition is conventionally prepared, for example, by smelting a batch composition and then passing the melt between fritting rollers or quickly quenching it in cold water. Each frit composition may then be conventionally dried and milled to a suitable size, such as to retain about 0.1% to about 12% by weight on a 200 mesh Tyler sieve.

In accordance with the present invention, it is necessary that the two frit compositions be applied to a substrate as an essentially dry and preferably completely dry system, such as in the form of a dry powder. It is possible to spray electrostatically onto a substrate a slip of a present frit composition, preferably containing little or no mill additives, since most of the water is lost through evaporation or overspray. The frit particles strike the substrate, lose their electrical charge and stick, aided by dampness. As used here and in the claims, the term "essentially dry" is taken to describe such a situation in which some water may be present.

However, it is much preferred for the particles of the frit compositions to be completely dry when they are applied to a substrate. This can be conveniently carried out by dusting the dried frit compositions, in turn, onto a horizontally disposed substrate laid flat on a suitable support. A preferred technique is to deposit the dried frit particles electrostatically onto the substrate which, in this instance, can if desired be vertically disposed. Any known means of electrostatic deposition can be employed for either dry powder or slip application. Electrical guns, voltage and current conditions, and related techniques for electrostatic deposition are known in the art. The electrostatic spray gun disperses a charged coated frit powder as a cloud of particles which are directed by virtue of their charge and the output air pressure of the spray gun toward a grounded substrate. The substrate of a workpiece on which the deposition takes place is conveniently electroconducting, such as a grounded metallic substrate like a steel panel. But the substrate need not be electroconducting. For example, a grounded, electroconducting plate can be placed behind a non-electroconducting substrate so as to attract the charged frit particles toward and onto such a substrate. Or an electroconducting screen (which can be a stencil screen) can be placed before a non-electroconducting substrate so as to attract and direct charged frit particles through the screen and onto the substrate. If desired, the frit particles of either composition can be coated with a liquid, curable, organopolysiloxane which is polymerized to a solid form before the powder is electrodeposited, as disclosed and claimed in U.S. Pat. No. 3,928,668 to Snow. This increases the retention of the electrostatic charge on the particles.

After the base and cover coats have been successively applied preferably as dried powders to a substrate, the assembly is fired. Because of the different fusing temperatures and reaction times of the two different frit compositions, a unique sequence of events takes place which enables a successful fusing of the two frit compositions and adherence of their resulting coats, not only to each other but, in the case of the base coat, to the substrate as well. The firing operation is usually at a temperature within the range of about 1300° F to about 1600° F. Normally, the substrate and its two coats are themselves at room temperature when first placed within a furnace maintained at a temperature within the indicated range. Or the substrate and dual coats may be carried through such a furnace by a conveyor system whose rate of travel is such as to expose the substrate and coats to the furnace heat for a desired length of time.

As the temperature of the substrate and coats rises during the firing operation, the first frit composition forming the base coat first begins to fuse and touches off a generation of gases and fuming which can result from the frit itself or from actual reaction with the substrate. It is essential that the first frit composition completes its gas evolution prior to the time the frit composition forming the cover coat first begins to fuse. Gases that may be evolved can include carbon monoxide, carbon dioxide, oxygen, water vapor, hydrogen, absorbed gases, residual sulfur and chlorine left over from pickling and other cleaning operations on the substrate, and the like. Thus, the first frit composition in time finally stabilizes and becomes quiescent.

Thereafter, at a higher temperature the second frit composition first fuses and similarly undergoes a reaction time. When the frit compositions fuse they form continuous coats in a conventional manner. As the assembly cools, the two coats solidify and adhere to each other and, in the case of the base coat, to the substrate as well. During the firing operation there is a reduction in coat thickness as the first particles melt, and on cooling there is a slight merging of the two coats although this is not necessary. For example, in an unfired state, the base coat may have a thickness of about 0.4 mil to about 8 mils, and the cover coat may have a thickness of about 8 mils to about 30 mils. Firing reduces the thickness to about one-half of the original dimension; or to about 0.2 mil to about 4 mils for the base coat and from about 4 mils to about 15 mils for the cover coat. These thicknesses of the coats are not critical although the coats should be continuous. Merging of the two coats upon firing, when it takes place, may form a merged interface of about 0.1 mil to about 4 mils in thickness.

FIG. 1 shows exemplary fusing and reaction times for base and cover coat compositions tested alone as well as fusing and reaction times for composite base and cover coats superimposed. These data were taken by subjecting the frit compositions deposited on a substrate to a furnace heat of 1480° F and noting the condition of the top exposed surface and elapsed time. The times are intended to be only illustrative of those met in working with frit compositions among those herein disclosed and are not meant to be restrictive. Frit compositions having fusing and reaction times falling outside of the values of FIG. 1 are still operative for the present purpose, as long as the first or base coat fuses and stabilizes during the firing operation at temperatures below that at which the second or cover coat fuses and stabilizes.

In the bar graph of FIG. 1 the uppermost bar, representing data from certain base coat compositions indicates that these compositions first began to fuse from about 34 seconds to about 40 seconds after being subjected to a furnace heat of 1480° F (first cross-hatched rectangle to the left), and that these same compositions continued to react, as previously described, after their initial fusion and finally became quiescent from about 43 seconds to about 49 seconds after being subjected to the same furnace heat (second cross-hatched rectangle to the right). The time in going from a point within the first cross-hatched rectangle to the left to a point within the second cross-hatched rectangle to the right can be considered the reaction time of a base coat frit composition having these fusing and reacting characteristics. The shorter this time period is, the better; because this insures that the base coat quickly rids itself of gases which otherwise adversely affect its adherence to the substrate and cover coat, as well as the ultimate appearance of the cover coat.

Similarly, the middle bar of FIG. 1 representing data for certain cover coats indicates that these compositions first began to fuse from about 59 seconds to about 69 seconds after being subjected to furnace heat of 1480° F and that the same compositions then continue to react and finally become quiescent from about 108 seconds to about 128 seconds after being initially subjected to the furnace heat.

The lowermost bar represents observational data from a composite of both base and cover coats in which only the cover coat could actually be observed. In these instances, the observed data showed initial fusion in about 54 seconds to about 65 seconds upon subjection to a furnace heat of 1480° F, and a reaction period lasting until about 88 seconds to about 118 seconds after initial heat subjection when the surface became quiescent. This lowermost bar shows that operation of the base coats is not adversely or otherwise substantially affected by the cover coats, or vice versa, since the fusion and reaction times of the cover coat are quite similar to those corresponding values of the middle bar representing data for cover coats alone. This, in turn, is due to the fact that the base coats have completed their fusion and reaction by the time the cover coats began to fuse and react.

As indicated, the times shown by FIG. 1 are not critical. As further non-critical examples, the base coat composition may fuse in about 20 seconds to about 80 seconds at a temperature of about 1100° F to about 1600° F and complete reaction in about 1 minute to about 4 minutes after initial heat. The cover coat composition may fuse in about 60 seconds to about 140 seconds at a temperature of about 1200° F to about 1650° F and complete reaction in about 2 minutes to about 10 minutes after initial heat. The base coat preferably is an amorphous glass to aid in adherence. The cover coat may be either an amorphous or crystalline glass but is preferably crystalline.

Normally, a ceramic coat that is formed by fusing and cooling on a metallic substrate is in a state of compression relative to the substrate due to their different rates of contraction upon cooling. As the substrate and coat are later slowly reheated, the reverse situation takes place due to their different rates of expansion. The ceramic coat passes from a state of compression to a state of tension until such time as the coat fuses and liquifies when it is under neither compression nor tension. Stress-strain curves known in the art are used to illustrate these changes over a temperature range.

Figure 2:
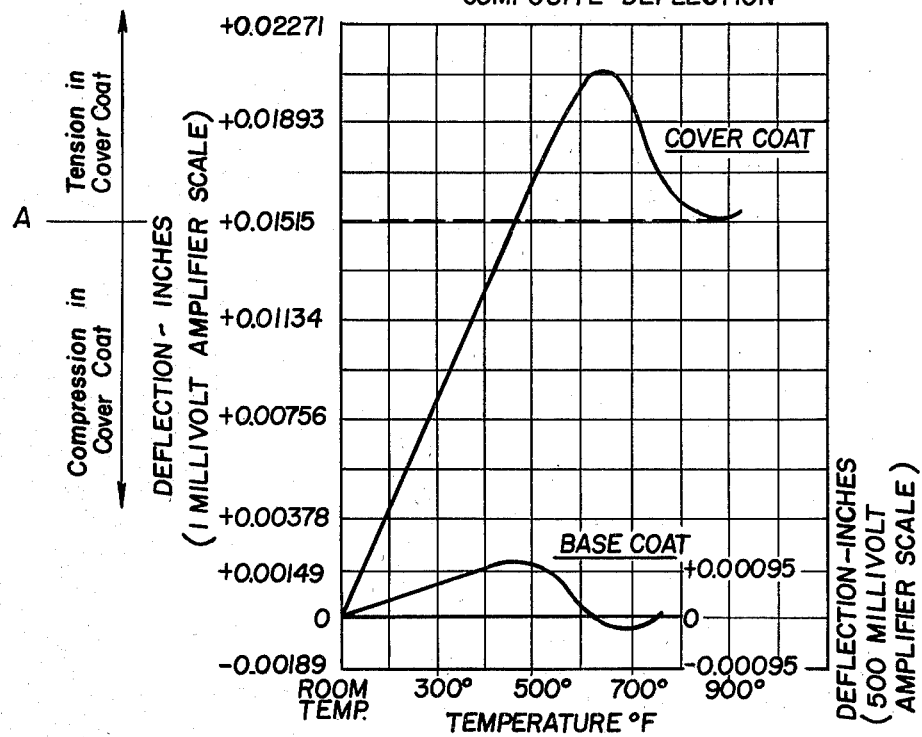
FIG. 2 is a graph of stress-strain curves for base and cover coats on separate steel substrates and shows the relative changes in compression and tension for such coats as the substrates are heated.

This phenomenon can be used to illustrate different stress-strain behaviors in base and cover coats of the present invention that are inherently due to their different compositions. The base coat must reach state of neither tension nor compression at a temperature below that at which the cover coat reaches a state of neither tension nor compression. FIG. 2 illustrates these changes with respect to particular base and cover coat compositions. In collecting data for this figure, the base coat had the composition of Example 4 hereinafter set forth. The cover coat had this composition in weight percent.

| | |
|---|---|
| $Al_2O_3$ | 0.9% |
| $B_2O_3$ | 15.0 |
| $K_2O$ | 9.1% |
| $Li_2O$ | 0.8% |
| $Na_2O$ | 7.6% |
| $P_2O_5$ | 1.8% |
| $SiO_2$ | 42.7% |
| $TiO_2$ | 16.5% |
| $ZrO_2$ | 5.6% |
| | 100.0% |
| F | 6.5% |

The fluorine was present as a fluoride of a metal of the glass replacing an equivalent amount of oxygen.

Dry frit particles of the base and cover coat compositions were separately electrostatically deposited onto two different specimens of 20 gauge sheet steel measuring 1 inch by 4 inches, after which both specimens were conventionally fired to fuse the frit composition and then cooled to form a ceramic coat adherent to the sheet steel. The sheet steel of each specimen was then vertically suspended at one end within an electric furnace and equipped at its other end with an extension arm which terminated in an electromagnetic core positioned within an electrically energized coil. As the steel sheet and ceramic coat were jointly heated at a constant rate to raise the temperature from room temperature to 900° F in 20 minutes, the difference in expansion rates of the ceramic coat and sheet steel caused the extension arm to swing. The extent of the resulting movement of the core attached to the arm within the coil in either direction was detected by a change of flux in the coil which could be correlated to inches of deflection of the specimen.

The resulting data are plotted in FIG. 2, the ordinates of the base coat being on the left (based on a 500 millivolt amplifier scale), and the ordinates of the cover coat being on the left (based on 1 millivolt amplifier scale). In FIG. 2, the lower line, representing the base coat, passes from compression to tension as shown by an increase in positive deflection (movement of the extension arm in one direction) until at about 450° F it reaches its greatest tension. Then with decreasing tension (and movement of the extension arm in the opposite direction), the base coat composition begins to fuse and flow until at about 670° F the base coat for the first time has neither compression nor tension.

Similarly, the upper line of FIG. 2, representing the cover coat, passes from compression to tension (at about 460° F, line A), until it reaches its greatest tension at about 650° F. Then with decreasing tension, the cover coat begins to fuse and flow until at about 890° F the cover coat for the first time has neither compression nor tension.

In accordance with the present invention, the base coat passes through the stage of compression to tension to a zero state in which it is neither under compression nor tension at a temperature below that at which the cover coat similarly reaches a state of neither compression nor tension for the first time. The ratio of the amount of tension to compression (as measured by the deflection along the ordinates above and below the line A, FIG. 2, respectively) should be greater for the cover coat than for the base coat.

The following examples are intended only to illustrate the invention and should not be construed as imposing limitations on the claims.

EXAMPLES 1 THROUGH 4

The following are examples of frit compositions which may be used for the first or base coat on a substrate. In each case the batch formulation is given in parts by weight, and the oxide analysis of the resulting glass is given in weight percent. The fluorine content is analyzed for fluorine alone, but it is present in the glass as a fluoride of one or more of the metals replacing an equivalent amount of oxygen.

EXAMPLE 1

| Batch Formulation | Parts by Weight | Oxide Analysis | Weight Percent |
|---|---|---|---|
| Dehydrated Borax | 577 | $Al_2O_3$ | 3.99% |
| Soda Ash | 344 | BaO | 5.39% |
| Fluorspar | 186 | $B_2O_3$ | 16.26% |
| Barium Carbonate | 172 | CaO | 5.30% |
| Cobalt Oxide | 25 | $Co_2O_3$ | 1.02% |
| Manganese Dioxide | 34 | $Li_2O$ | 2.89% |
| Black Nickel Oxide | 12 | $MnO_2$ | 1.20% |
| Sodium Tripolyphosphate | 51 | $Na_2O$ | 17.14% |
| Lithium Carbonate | 113 | NiO | 0.48% |
| Milled Zircon | 302 | $P_2O_5$ | 1.20% |
| Powdered Quartz | 507 | $SiO_2$ | 35.04% |
| Spodumene | 363 | ZnO | 1.91% |
| Sodium Silicofluoride | 67 | $ZrO_2$ | 8.91% |
| Zinc Oxide | 147 | Total | 100.01% |
| Total | 2900 | F | 5.20% |

EXAMPLE 2

| Batch Formulation | Parts by Weight | Oxide Analysis | Weight Percent |
|---|---|---|---|
| Dehydrated Borax | 532 | $SiO_2$ | 38.79% |
| Powdered Quartz | 714 | $B_2O_3$ | 15.26% |
| Soda Ash | 380 | $Na_2O$ | 18.67% |
| Soda Nitrate | 78 | $K_2O$ | 0.54% |
| Fluorspar | 149 | $Li_2O$ | 2.03% |
| Barium Carbonate | 345 | CaO | 5.50% |
| Sodium Silico Fluoride | 75 | $Al_2O_3$ | 4.72% |
| Lithium Carbonate | 81 | BaO | 11.89% |
| Spodumene | 157 | $Co_2O_3$ | 0.52% |
| Whiting | 41 | $MnO_2$ | 0.32% |
| Feldspar | 124 | NiO | 0.91% |
| Alumina | 48 | Iron Oxide | 0.89% |
| Iron Oxide | 20 | Total | 100.04% |
| Cobalt Oxide | 12 | | |
| Nickel Oxide | 22 | F | 5.76% |
| Manganese Dioxide | 9 | | |
| Total | 2787 | | |

EXAMPLE 3

| Batch Formulation | Parts by Weight | Oxide Analysis | Weight Percent |
|---|---|---|---|
| Dehydrated Borax | 486 | $Al_2O_3$ | 3.24% |
| Soda Ash | 387 | BaO | 19.82% |
| Sodium Nitrate | 50 | $B_2O_3$ | 15.05% |
| Fluorspar | 214 | CaO | 6.70% |
| Barium Carbonate | 575 | $Co_2O_3$ | 0.45% |
| Cobalt Oxide | 10 | $Li_2O$ | 3.39% |
| Nickel Oxide | 26 | $Na_2O$ | 20.02% |
| Lithium Carbonate | 142 | NiO | 1.15% |
| Powdered Quartz | 418 | $SiO_2$ | 28.71% |
| Spodumene | 268 | $Fe_2O_3$ | 1.48% |
| Sodium Silico Fluoride | 165 | Total | 100.01% |
| Iron Oxide | | | |
| | | F | 8.95% |
| Total | 2774 | | |

EXAMPLE 4

| Batch Formulation | Parts by Weight | Oxide Analysis | Weight Percent |
|---|---|---|---|
| Dehydrated Borax | 563 | $SiO_2$ | 39.91% |
| Soda Ash | 20 | $B_2O_3$ | 15.92% |
| Potassium Carbonate | 21 | $Na_2O$ | 9.51% |
| Sodium Nitrate | 83 | $K_2O$ | 0.58% |
| Fluorspar | 192 | $Li_2O$ | 5.33% |
| Lithium Carbonate | 190 | CaO | 5.49% |
| Spodumene | 826 | $Al_2O_3$ | 9.11% |
| Sodium Silico Fluoride | 53 | BaO | 11.48% |
| Powdered Quartz | 430 | $Co_2O_3$ | 0.86% |
| Barium Carbonate | 365 | NiO | 0.94% |
| Cobalt Oxide | 21 | $Fe_2O_3$ | 0.85% |
| Nickel Oxide | 23 | Total | 99.98% |
| Red Iron Oxide | 21 | | |
| | | $F_2$ | 4.98% |
| Total | 2798 | | |

EXAMPLE 5

There is no criticality as to the frit composition which may be used to form the glass of the second or cover coat. The following oxide analysis in weight percent in an example of some glasses which may be so used:

$SiO_2$: 40 to 50%
$B_2O_3$: 10 to 20%
$Na_2O$: 5 to 10%
$K_2O$: 5 to 10%
$TiO_2$: 15 to 25%
$P_2O_5$: 0 to 5%
$F_2$: 0 to 5%

As before, when the fluorine is present, it is as a fluoride of at least one of the metals replacing an equivalent amount of oxygen.

EXAMPLE 6

A base coat composition of the batch formulation and oxide weight percentage of Example 1 was smelted in a conventional manner at a temperature within the range of about 2000° F to about 2300° F to a clear thread. The smelt was quenched in cold water to form frit. The frit was then ball-milled in a dry mill to a fineness between zero percent on a 400 mesh to about 6 weight percent retention on a 200 mesh Tyler Sieve. Preferably the fineness is between about 0.1% to about 0.5% on a 200 mesh sieve, the balance being finer than 200 mesh. The milled ground coat was now ready for application.

A base coat of about 3 to about 9 grams per square foot was electrostatically deposited by standard means onto a pickled, cold-rolled iron panel normally used for enameling. Immediately thereafter without an intervening firing operation, frit particles similarly prepared from a composition corresponding to that of Example 5 was electrostatically deposited over the base coat in a thickness of about 25 to 60 grams per square foot of surface.

The substrate and two deposited coats were then simultaneously fired by passing the assembly through a firing furnace maintained at about 1300° to about 1540° F. The base coat fused and stabilized at a temperature below the temperature at which the top coat first began to fuse. Upon cooling, a dual coat coherent ceramic layer from the two frit compositions formed on the enameling iron substrate. The two coats were tightly adherent to each other and, in the case of the base coat, adherent as well to the substrate. The surface of the cover coat was not flawed by blisters, pitts, spalls, and the like. The fired dual coat measured about 4 to 7 mils in thickness.

EXAMPLE 7

A procedure was carried out like the procedure of Example 6 except that the cover coat was porous and contained an oxidation catalyst, so that the final product was adapted to be used as a self-cleaning oven liner.

The cover coat had the following oxide analysis in weight percent:

| | |
|---|---|
| $B_2O_3$ | 3.03% |
| $Na_2O$ | 8.01% |
| $K_2O$ | 6.64% |
| BaO | 2.10% |
| CaO | 0.54% |
| $Li_2O$ | 0.99% |
| $MnO_2$ | 10.00% |
| $P_2O_5$ | 2.38% |
| $SiO_2$ | 41.37% |
| $TiO_2$ | 10.13% |
| ZnO | 4.90% |
| $Sb_2O_5$ | 9.31% |
| Total | 99.40% |

In this composition, the manganese dioxide was the oxidation catalyst. It could be present in an amount of 10% to about 70% by weight of the cover coat.

The present process and product provide an attractive ceramic coated substrate and do so at substantial savings in cost, including fuel costs. Not only are the fuel requirements for one firing operation entirely eliminated, but the labor and use of equipment attendent a second firing operation are likewise eliminated. Further, if desired, non-premium metallic substrates can be used such as cold-rolled steel normally used for enameling.

The advantages of the invention are primarily due to using dry or essentially dry frit compositions and thereby avoiding a wet system and its mill-added salts. In a wet system, these and other salts are free to migrate from one coat to the other, and particularly from the cover coat to the base coat, and thereby interfere with satisfactory firing of these coats and ultimate appearance of the cover coat.

Although the foregoing describes several preferred embodiments of the present invention, it is understood that the invention may be practiced in still other forms within the scope of the following claims.

I claim:

1. A process for applying a dual coat ceramic layer to a substrate in a single firing operation, comprising applying to the substrate a first coat of an essentially dry powder of a first frit composition adapted to form a glass adherent to said substrate, applying to said first coat a second coat of an essentially dry powder of a second frit composition normally not adapted as a glass to adhere to said substrate, subjecting said substrate and coats to a single firing operation, initially fusing and completely stabilizing said first frit composition within a temperature range below that at which said second frit composition first fuses and stabilizes, then fusing and stabilizing said second frit composition within a temperature range higher than said first temperature range, whereby said first coat reaches a state of neither tension nor compression at a temperature below that at which said second coat first reaches a state of neither tension nor compression, and finally cooling to form a coherent ceramic layer of two substantially continuous coats on said substrate from the two frit compositions.

2. The process of claim 1 in which said substrate is a carbon-rich metallic substrate adapted for porcelain enameling.

3. The process of claim 1 in which said firing operation is within the range of about 1300° F to about 1600° F.

4. The process of claim 1 in which said first frit composition forms an alkaline oxide borosilicate glass.

5. The process of claim 1 in which said first frit compositions forms an alkaline oxide borosilicate glass comprising in weight percent:

$B_2O_3$: 8 to 25%
$SiO_2$: 20 to 50%
Alkaline Oxide: 15 to 40%

6. The process of claim 1 in which said first frit composition forms an alkaline oxide borofluorosilicate glass.

7. The process of claim 1 in which said first frit composition forms an alkaline oxide borofluorosilicate glass comprising in weight percent:

Alkaline Oxide: 12 to 30%
Boron Oxide: 10 to 30%
Fluorine: 0.1 to 10%
Silica: 20 to 50% said fluorine being present as a fluoride of at least one metal of the glass replacing an equivalent amount of oxygen.

8. The process of claim 1 in which said first frit composition forms an alkaline borofluorosilicate glass comprising in weight percent:

Alkaline Oxide: 15 to 26%
Boron Oxide: 12 to 20%
Fluorine: 0.5 to 5%
Silica: 25 to 40% said fluorine being present as a fluoride of at least one metal of the glass replacing an equivalent amount of oxygen.

9. The process of claim 1 in which said first frit composition forms a glass comprising in weight percent 55% to about 95% of an alkaline borofluorosilicate glass and from about 5% to about 45% of additives, said borofluorosilicate glass comprising in weight percent:

Alkaline Oxide: 12 to 30%
Boron Oxide: 10 to 30%
Fluorine: 0.1 to 10%
Silica: 20 to 50% said fluorine being present as a fluoride of at least one metal of the glass replacing an equivalent amount of oxygen, and said additives comprising in weight percent:

Cobalt Oxide: 0 to 7%
Nickel Oxide: 0 to 7%
Manganese Oxide: 0 to 7%
Iron Oxide: 0 to 3%
Aluminum Oxide: 0 to 15%
Zirconium Oxide: 0 to 25%
Zinc Oxide: 0 to 10%
$P_2O_5$: 0 to 5%
Calcium Oxide: 0 to 15%
Cesium Oxide: 0 to 5%
Strontium Oxide: 0 to 3%

10. The process of claim 9 in which said first frit composition forms a glass comprising in weight percent from about 60% to about 80% by weight of said borofluorosilicate glass and from about 20% to about 40% by weight of said additives.

11. The process of claim 1 in which said second frit composition forms a glass comprising in weight percent:

$Al_2O_3$: 0 to 20%
$BaO$: 0 to 20%
$B_2O_3$: 0 to 30%
$CaO$: 0 to 30%
$K_2O$: 0 to 20%
$Li_2O$: 0 to 15%
$Na_2O$: 0 to 20%
$P_2O_5$: 0 to 20%
$Sb_2O_3$: 0 to 30%
$SiO_2$: 10 to 60%
$TiO_2$: 0 to 30%
$ZnO$: 0 to 20%
$F$: 0 to 10%
Metal Oxides: 10 to 70% said fluorine being present as a fluoride of at least one metal of the glass replacing an equivalent amount of oxygen, and the metal of said metal oxides being selected from the group consisting of copper, cobalt, manganese, chromium, and mixtures thereof.

12. The process of claim 1 in which said first frit composition fuses and stabilizes in a temperature range of about 1100° F to about 1600° F, and second frit composition fuses and stabilizes in a temperature range of about 1200° F to about 1650° F.

13. The process of claim 1 in which prior to said firing step the layer of the first frit composition has a thickness of about 0.4 mil to about 8 mils, and the layer of the second frit composition has a thickness from about 8 mils to about 30 mils.

14. The process of claim 1 in which at least one of said powders is completely dry and is applied to the substrate electrostatically.

15. The process of claim 1 in which both of said powders are completely dry and are applied to the substrate electrostatically.

16. A process for applying a dual coat ceramic layer to a substrate in a single firing operation, comprising applying to the substrate a first coat of an essentially dry powder of a first frit composition adapted to form a glass adherent to said substrate, applying to said first coat a second coat of an essentially dry powder of a second frit composition normally not adapted as a glass to adhere to said substrate, subjecting said substrate and coats to a single firing operation, sequentially fusing and completely stabilizing in turn said first frit composition within a first temperature range and then said second frit composition at a second and higher temperature range, and then cooling to form a dual coat coherent ceramic layer on said substrate from the two frit compositions.

* * * * *